United States Patent
Marchand et al.

(10) Patent No.: US 7,760,862 B2
(45) Date of Patent: Jul. 20, 2010

(54) DOMESTIC TO INTERNATIONAL COLLECT CALL BLOCKING

(75) Inventors: Dean C. Marchand, Brighton, CO (US); Arthur Lance Springer, Waterloo, IA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 817 days.

(21) Appl. No.: 11/520,999

(22) Filed: Sep. 14, 2006

(65) Prior Publication Data

US 2007/0121886 A1    May 31, 2007

Related U.S. Application Data

(63) Continuation of application No. 09/859,337, filed on May 17, 2001, now abandoned.

(51) Int. Cl.
*H04M 15/00*    (2006.01)
*H04M 17/00*    (2006.01)

(52) U.S. Cl. .............................. 379/114.14; 379/114.04; 379/145; 379/127.02; 379/189

(58) Field of Classification Search .............. 379/91.01, 379/91.02, 93.02, 93.03, 111, 114.04, 114.14, 379/114.05, 114.2, 115.02, 115.03, 121.01, 379/127.02, 144.01, 144.03, 145, 188, 189, 379/191, 194, 197; 455/406, 410, 411
See application file for complete search history.

(56) References Cited

U.S. PATENT DOCUMENTS

| | | | |
|---|---|---|---|
| 4,756,020 A | 7/1988 | Fodale | |
| 5,465,293 A | 11/1995 | Chiller et al. | |
| 5,495,521 A | 2/1996 | Rangachar | |
| 5,566,234 A | 10/1996 | Reed et al. | |
| 5,602,906 A * | 2/1997 | Phelps | 379/114.14 |
| 5,768,354 A | 6/1998 | Lange et al. | |
| 5,875,236 A * | 2/1999 | Jankowitz et al. | 379/114.24 |
| 5,937,043 A * | 8/1999 | He | 379/114.14 |
| 5,943,403 A * | 8/1999 | Richardson et al. | 379/88.26 |
| 5,963,625 A | 10/1999 | Kawecki et al. | |
| 6,404,871 B1 * | 6/2002 | Springer et al. | 379/189 |
| 6,556,669 B2 * | 4/2003 | Marchand et al. | 379/114.14 |
| 6,668,045 B1 * | 12/2003 | Mow | 379/88.19 |
| 7,209,964 B2 * | 4/2007 | Dugan et al. | 709/223 |

\* cited by examiner

*Primary Examiner*—Binh K Tieu

(57) ABSTRACT

A method and device for preventing fraud in collect calls from a domestic origin point to an international terminating point through a long-distance telecommunications system is described. In the system and method, a Screening for International Calls database is added to the call processing platform. This Screening of International Calls database contains records keyed by country codes, and each record has a blocked collect call field listing destination numbers that are blocked from receiving collect calls. When a domestic-to-international collect call is made, the record corresponding to the country code of the international terminating point of the collect call is retrieved from the Screening for International Calls database. This record is checked to determine if the destination number of the collect call matches any destination numbers listed in the blocked collect call field of the country code database record. If there is a match, the call is blocked.

20 Claims, 5 Drawing Sheets

DOMESTIC TO INTERNATIONAL COLLECT CALL BLOCKING

RELATED APPLICATIONS

The present application is a continuation of U.S. patent application Ser. No. 09/859,337 filed on May 17, 2001, the contents of which are hereby incorporated by reference.

BACKGROUND

1. Technological Field

The present application relates generally to fraud control in telecommunications systems and, in particular, to preventing fraud in collect calls from a domestic origin point to a international terminating point in a long distance telecommunications network.

2. Description of the Related Art

The telecommunications industry has experienced significant changes in the way that customers are billed for their telephone calls. From the once simple method of billing the originating caller, many methods have been developed, allowing greater flexibility for the telecommunications customer. A predominant method for making telephone calls away from home or the office is by utilizing a collect calling scheme to charge the call. In this scheme, the party at the terminating end of the connection pays the charges associated with the call. This method has grown to include international destinations, which is the subject of the present invention.

Collect call customers may use any telephone facility, including public facilities, to make a call that will be charged to the account of the receiving party. When calling domestically, the process of making collect calls typically includes dialing an access number, such as "0" or "1-800-COLLECT", waiting for an automatic audio prompt or an operator, and then entering the calling party's name and the called party's number. After that, the connection is made with the terminating party and authorization from the called party is sought. If authorization is given, the call is released and the parties continue their conversation. These collect calls are one type of a category of phone calls called "special service" calls. These special service calls, which include "700", "800/888", and "900" number calls, allow contemporary telecommunications networks to provide many services beyond direct long distance dialing. It is the long distance carriers that provide this special service call processing, which allows for toll-free calls, calling card calls, special rate calls, etc.

An example of a domestic collect call will now be described, with reference to FIGS. 1A, 1B, and 2. In FIGS. 1A and 1B, a caller at telephone 111 wishes to make a collect call to telephone 199. The caller may enter an access code or "0" and the terminating number to initiate the collect call. The call is then routed through Local Exchange Carrier (LEC) 120. A local exchange carrier refers to local telephone companies, such as the Regional Bell Operating Companies (RBOCs), which provide local transmission services for their customers. For purposes of the present description, we are assuming that the call is either to a long-distance termination point or that the caller at telephone 111 dialed in an access code that is routed to a long distance carrier. Either way, the call will be routed to a long distance telecommunications company. Specifically, the routers in the LEC will forward the call to the network of the appropriate long distance carrier (or Inter-Exchange Carrier IXC) 130.

After switching through LEC switches 122 and 124, the collect call is routed from POP (Point-of-Presence) switch 125 into the IXC 130, and then through IXC switches 137 and 132, to a bridge switch 135. The purpose of the bridge switch 135 is to receive calls from the IXC network and bridge them to Automatic Call Distributor (ACD) 140 and, ultimately, into the Intelligent Services Network platform (ISN) 150. Because special service calls require special call processing, they are typically routed to a call processing platform, such as the ISN platform 150. There are a number of ISNs within the IXC, but, for the purpose of understanding the present invention, one ISN will suffice.

An exemplary and simplified diagram of the ISN platform 150 will now be described with reference to FIG. 2. The ACD 140 is under the direct control of the Application Processor APP 156, which is a general purpose computer that functions as the central point for call routing control in the ISN 150. When the collect call arrives at the ACD 140, the ACD 140 makes a request to the APP 156 for directions as to how the call should be handled. Such a request would usually be accompanied by information concerning the call; e.g. the destination number, or Automatic Number Identifier (ANI), of the call, as well as the access code, if one was used. The APP 156 would recognize that the call is a collect call and, consequently, the APP 156 would instruct the ACD 140 to deliver the call to the appropriate queue. In this case, the APP 156 may send it to either to a live operator at the Manual Telecommunications Operator Console (MTOC) 154, or to the Automatic Response Unit (ARU) 152. The ARU 152 comprises two components, one to process the call, the other to prompt the caller with a voice response system. It is the ARU 152 that will ask the caller for the required final destination number (if it wasn't entered initially), the calling party's name, and any additional information. When a live operator is used, the operator enters the same information at the MTOC 154. Whether the call is routed to the ARU 152 or the MTOC 154, the same information will be entered. In other words, regardless of whether it is entered by the operator at the MTOC 154 or by the caller at her telephone 111 to the ARU 152, items such as the calling party's name will have to be entered.

The various elements in the ISN platform 150 are connected by a Local Area Network (LAN) 158, such as Ethernet or DECNet. Regardless of whether the collect call is being processed at the ARU 152 or the MTOC 154, certain validation information concerning the final destination, the paying party's telephone 199, needs to be obtained. For instance, whether the destination number is a pay phone needs to be determined prior to calling the destination number in order that fraud is avoided. Because of this and other reasons, the Bell companies developed the Line Information Database (LIDB) system in the early 1980's. This is a central database accessible from all telecommunications switches which provides information concerning credit validation; both the LECs and the IXCs have access to the LIDB and use it for call credit verification. A simplified view of this relationship is shown in FIGS. 1 and 2, where the LIDB 170 is directly connected to the ISN 150 and shares information with LECs 120 and 160. This is simplified because the real system consists of multiple LIDBs, where each LEC maintains a centralized LIDB that is continually sharing information and updating the other LIDBs. The centralized LIDB for LEC 160 is the primary source for information on any terminating points serviced by LEC 160. IXCs may keep their own local copy for frequently accessed numbers of other LIDBs and for other systems to obtain information concerning their card holders. Even within an individual LEC or IXC, there are multiple intermediaries between the centralized LIDB and the automated switches or line operators that use LIDB information. For instance, an ISN platform 150 will often maintain a local copy of the LIDB 170 for quicker access. However, the entire system is often referred to as a single LIDB, as one skilled in the relevant art would know.

In our example, either the MTOC 154 or the ARU 152 accesses the LIDB 170 through the LAN 158, as shown in FIG. 2. The LIDB 170 validates the credit of the destination number, or called party, before the MTOC 154 or ARU 152 contacts the called party for authorization of the collect call. Once the call is credit validated, either the ARU 152 or MTOC 154 connects the terminating leg of the call, as shown in FIG. 1B. The terminating leg extends through IXC switches 132, 131, and 133, to the POP switch 166 of LEC 160. Once in LEC 160, the call is switched through LEC switches 164 and 162 to the called party's telephone 199. If someone answers at telephone 199, either the ARU 152 or MTOC 154 attempts to get authorization from the called party. If authorization is received, either the ARU 152 or MTOC 154 releases the call to the automated switches of the IXC network 130. This means the call is torn down from the bridge switch 135 and maintained by the IXC switches for the duration of the call. If the called party declines to authorize the call, the terminating leg of the call will be disconnected.

Fraud analysts or automated programs located at the Fraud Control console 100 can also access the LIDB 170 to read or alter information. Fraud Control 100 monitors the traffic on IXC network 130 and attempts to isolate suspicious activity. Thresholds are kept in order to issue alerts when traffic shows symptoms of fraudulent activity. If Fraud Control 100 finds fraudulent activity at a certain terminating telephone, Fraud Control 100 may enter the LIDB 170 and change the records so that the terminating ANI can no longer receive collect calls.

However, this method of blocking fraudulent collect calls using the LIDB 170 is of no help with collect calls that originate domestically and terminate in international locations. Unlike the situation described above, there is no LIDB maintained on an international level with countries such as England or Chile. For example, when a caller at telephone 111 in FIG. 3 attempts to make a collect call to a telephone, in this case, a cellular phone in car 399, in England, the call is processed differently. Although the collect call will still go through the LEC 120, IXC switches 137 and 132, and bridge switch 135 to ACD 140 and the ISN platform 150, the processing in the ISN platform 150 is different. Because there is no international LIDB, either the MTOC 154 or ARU 152 will make no attempt at credit validation, except contacting the other country's telecommunications carrier, in this case, British Telecom 315. Regardless of whether an operator at British Telecom 315, an operator at MTOC 154, or an automated program at ARU 152 makes the final connection with the called party, it is the foreign telephone company, British Telecom 315, which validates the final destination of the call, a cellular phone in an automobile 399. But often the foreign telephone company does not keep adequate records on all the telephones in its operating area, and the IXC network 130 will end up maintaining a long-distance connection for which no one will pay. This is particularly true of cellular phones in foreign countries, because cellular phones maintain their connection with the telephone network through a radio link with a base station 312. Cellular phones have no fixed location from which to disconnect telephone lines or block calls and, without a highly efficient local validation system in effect, can be easily used fraudulently.

Therefore, there is a need to block fraudulent collect calls from domestic originating points to international terminating points through long distance telecommunications systems. Furthermore, the manner of blocking calls must be maintained within the long distance telecommunication system.

SUMMARY

One object of this invention is to provide a system and method of blocking domestic-to-international collect calls to suspect terminating destinations in a long distance telecommunications network.

Another object of this invention is to provide a system and a method for providing a screening database for domestic-to-international collect calls in a long distance telecommunications network.

To accomplish the above and other objects, a system and method for preventing fraud on international collect calls from an domestic origin point to an international terminating point through a long-distance telecommunications system is disclosed. In the system and method, a "Screening for International Calls" database is added to the ISN platform. This Screening of International Calls database contains records keyed by country codes, and each record has a blocked collect call field listing destination numbers or portions of destination numbers that are blocked from receiving collect calls. When a domestic-to-international collect call is made, the record corresponding to the country code of the international terminating point of the collect call is retrieved from the Screening for International Calls database. This record is checked to determine if the destination number of the collect call matches any destination numbers listed in the blocked collect call field of the country code database record. If there is a match, the call is blocked.

BRIEF DESCRIPTION OF THE FIGURES

The foregoing and other objects, aspects and advantages will be better understood from the following detailed description of a preferred embodiment as illustrated in the following drawings. In the drawings, like reference numbers indicate identical or functionally similar elements.

DETAILED DESCRIPTION OF THE PREFERRED EMBODIMENTS

In the following description, the term "network" is a shorthand description of the conglomeration of databases, trunk and telephone lines, routers, switches, protocols, and computers that are required to make a telecommunications network.

Figure 4:
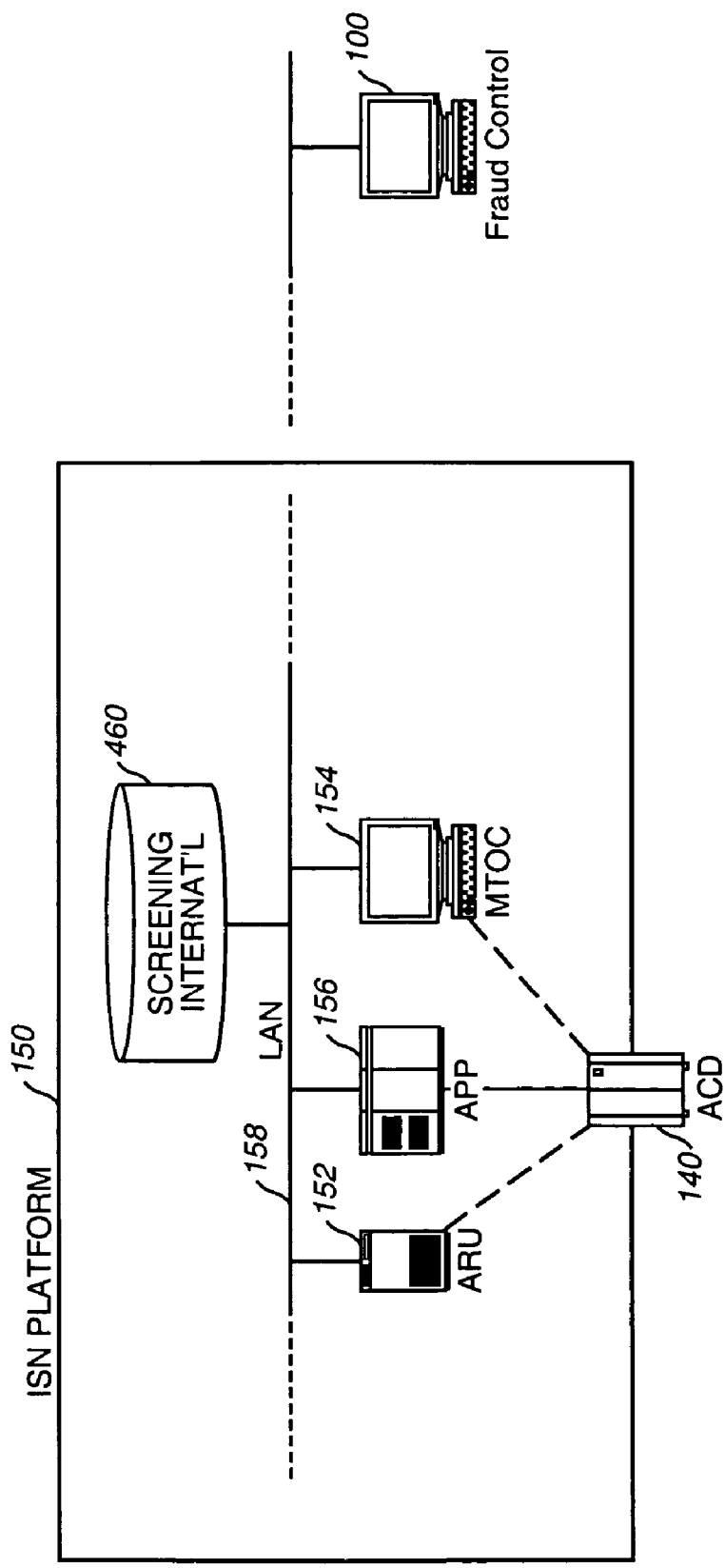
FIG. 4 is a schematic diagram of an exemplary and simplified call processing platform with associated fraud control system, according to the preferred embodiment of the present system and method.

In short, the preferred embodiment of the present system and method allows particular international terminating destinations to be blocked from receiving collect calls. Each international country has a country code (CC) associated with it, and a record is maintained for each CC. Although the preferred embodiment uses CCs, codes indicating smaller units, such as provinces or cities, could be used. These CC records are maintained in a Screening for International Calls database (SCREENING INTERNAT'L) 460, which is added to the ISN platform 150 as shown in FIG. 4. SCREENING INTERNAT'L 460 can be located outside the ISN platform 150 in other embodiments, but both Fraud Control 100 and the ISN platform 150 must have some sort of access to it. In the preferred embodiment, in a manner akin to the LIDB, there is a centralized SCREENING INTERNAT'L database for the entire IXC network 130, and smaller local copies are maintained at appropriate spots throughout the telecommunications system. Similarly to the LIDB, the SCREENING INTERNAT'L database will be referred to as a single unit in this application.

The CC records in the Screening for International Calls database are keyed by the country code and contain information concerning categories of billing products (calling cards, collect calls, third party calls, etc.), type of call, and blocked destination phone numbers (hereinafter "destination numbers"). Specifically, a blocked collect call field is added to the CC records in the SCREENING INTERNAT'L 460 database; and any destination number listed in that field of the CC record is blocked from receiving collect calls. In other words, when a domestic-to-international collect call is made, the CC record of a particular destination country or country code is looked up in the SCREENING INTERNAT'L 460, and it is determined if the terminating destination number of the call is listed in the blocked collect call field of the CC record. If it is, the collect call is blocked.

In the preferred embodiment, Fraud Control console 100 in FIG. 4 will determine which terminating destinations numbers in a particular country will be blocked from receiving collect calls. Many methods may be used to ascertain fraudulent destination numbers to be entered in the SCREENING INTERNAT'L 460 database. For example, past collect call destination numbers that have ended up not paying will be added to the blocked collect call field of the appropriate CC record. Further if a customer account associated with an international destination number has an overdue balance, the destination number will be added to the blocked collect call field of the appropriate CC record. Either an automated program or a fraud analyst at Fraud Control console 100, which is connected either directly or indirectly with the ISN platform 150, would add these destination numbers to the CC record in the SCREENING INTERNAT'L 460 database. In addition, Fraud Control 100 monitors network traffic in order to determine if particular international destination numbers exhibit suspicious behavior. Typically, Fraud Control console 100 also receives updates from foreign telephone companies, listing fraudulent destination numbers, or groups of destination numbers.

The Fraud Control console 100 has the ability to block larger and smaller terminating destination numbers by altering the digits that are placed in the blocked collect call field of a CC record. For example, although a single cellular phone with telephone number 555-5433 could be blocked from receiving collect calls by placing 555-5433 in the blocked collect call field, it is also possible to block the whole series of numbers that begin with 555-5 by entering 555-5*** in the blocked collect call field. The "*" is a "wildcard" character which can represent any number. This is helpful in the case when an entire series of numbers is being used by suspected cellular phones. It is also helpful when fraud control 100 uses fraud-to-revenue ratio analysis on destination exchanges, such as "555". Once this fraud-to-revenue ratio reaches a certain threshold, Fraud Control 100, either manned by a fraud analyst or under the control of an automated program, will decide whether to place a block on that terminating destination exchange. If it is decided to do so, the terminating destination exchange will be placed in the blocked collect call field of the INTERNAT'L SCREENING database 460 CC record of the originating country.

Figure 1A:
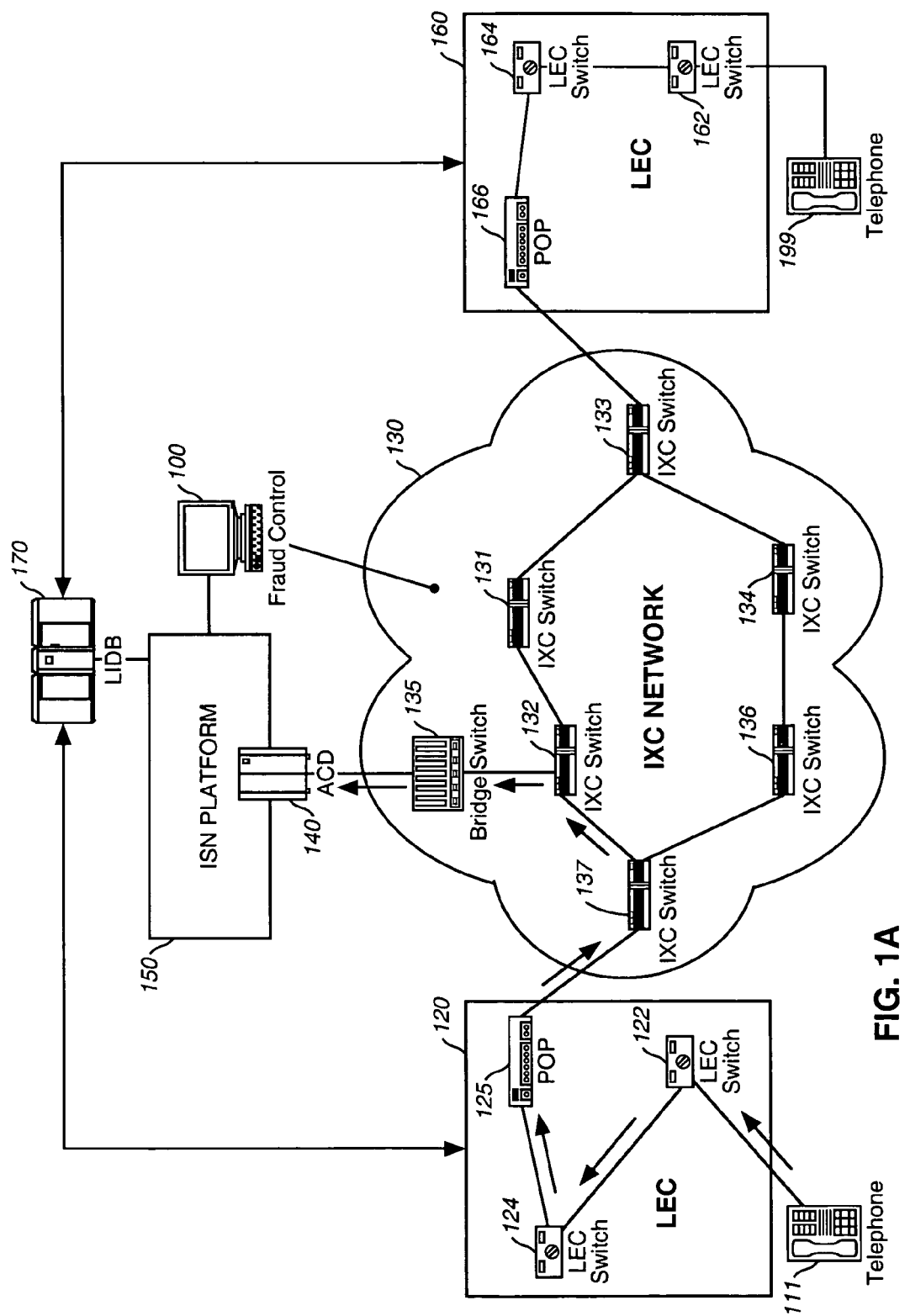
FIGS. 1A and 1B are schematic diagrams of an exemplary domestic collect call through a long distance telecommunications system.
Figure 1B:
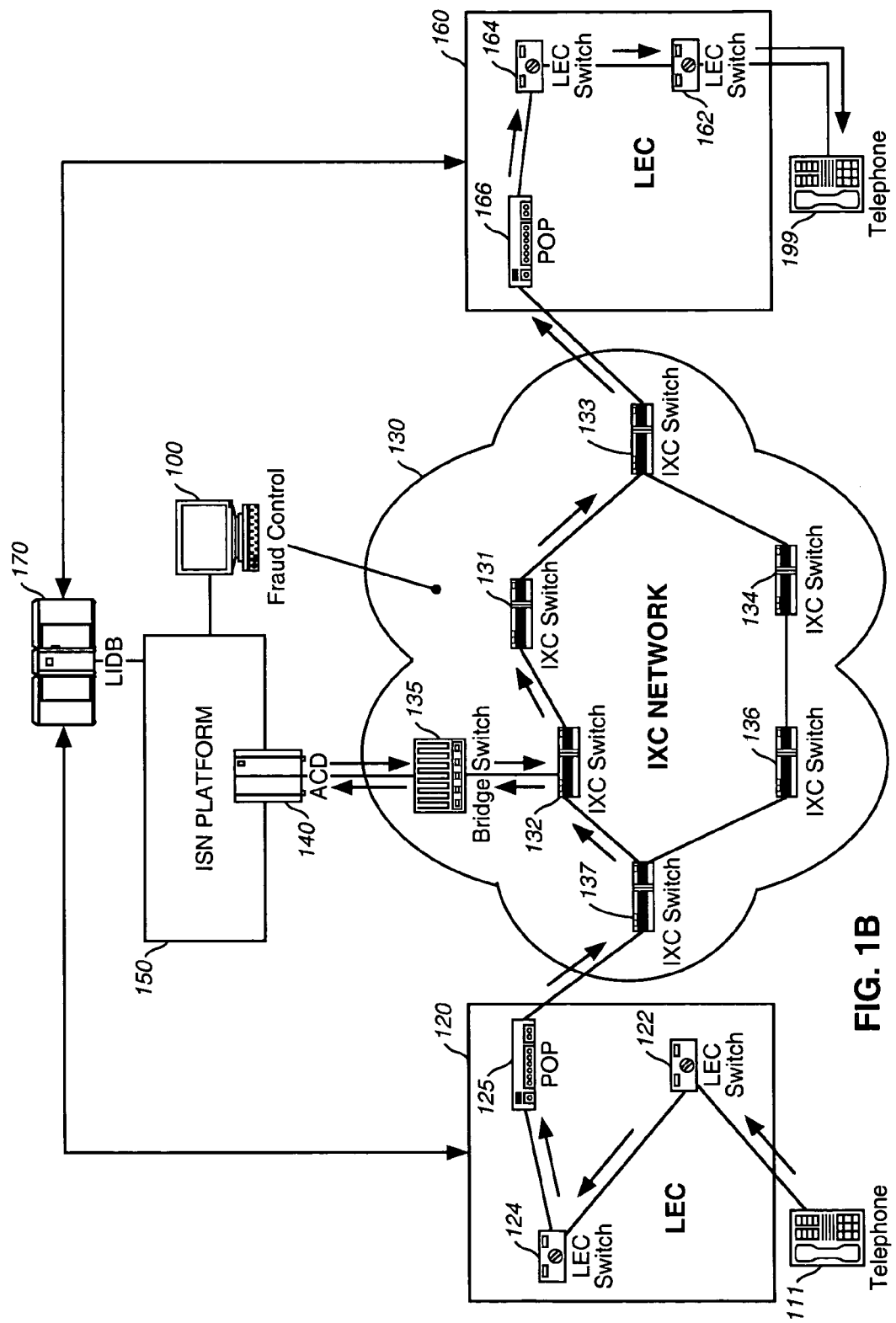
Figure 2:
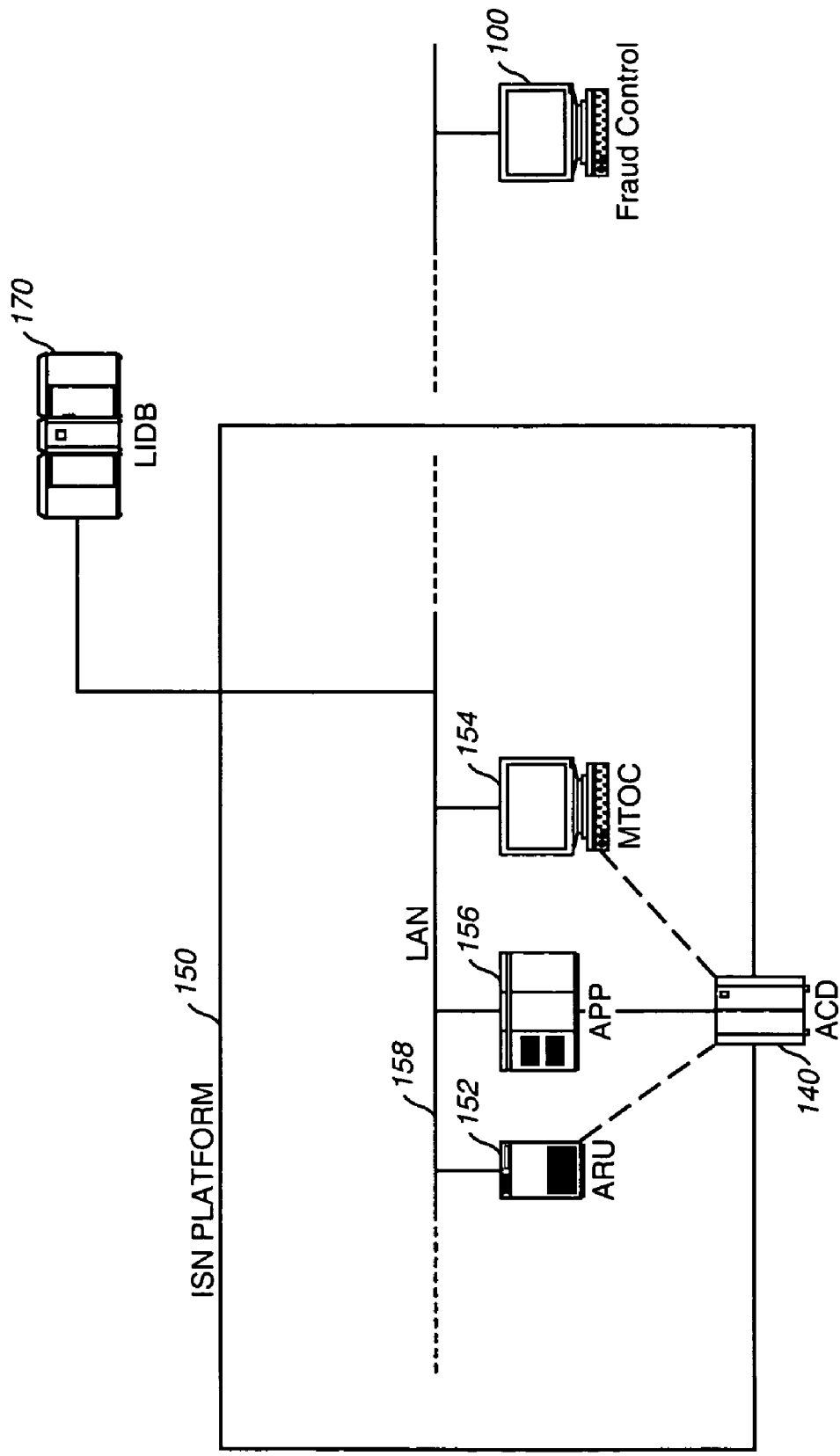
FIG. 2 is a schematic diagram of an exemplary and simplified call processing platform with associated fraud control system, according to the prior art.
Figure 3:
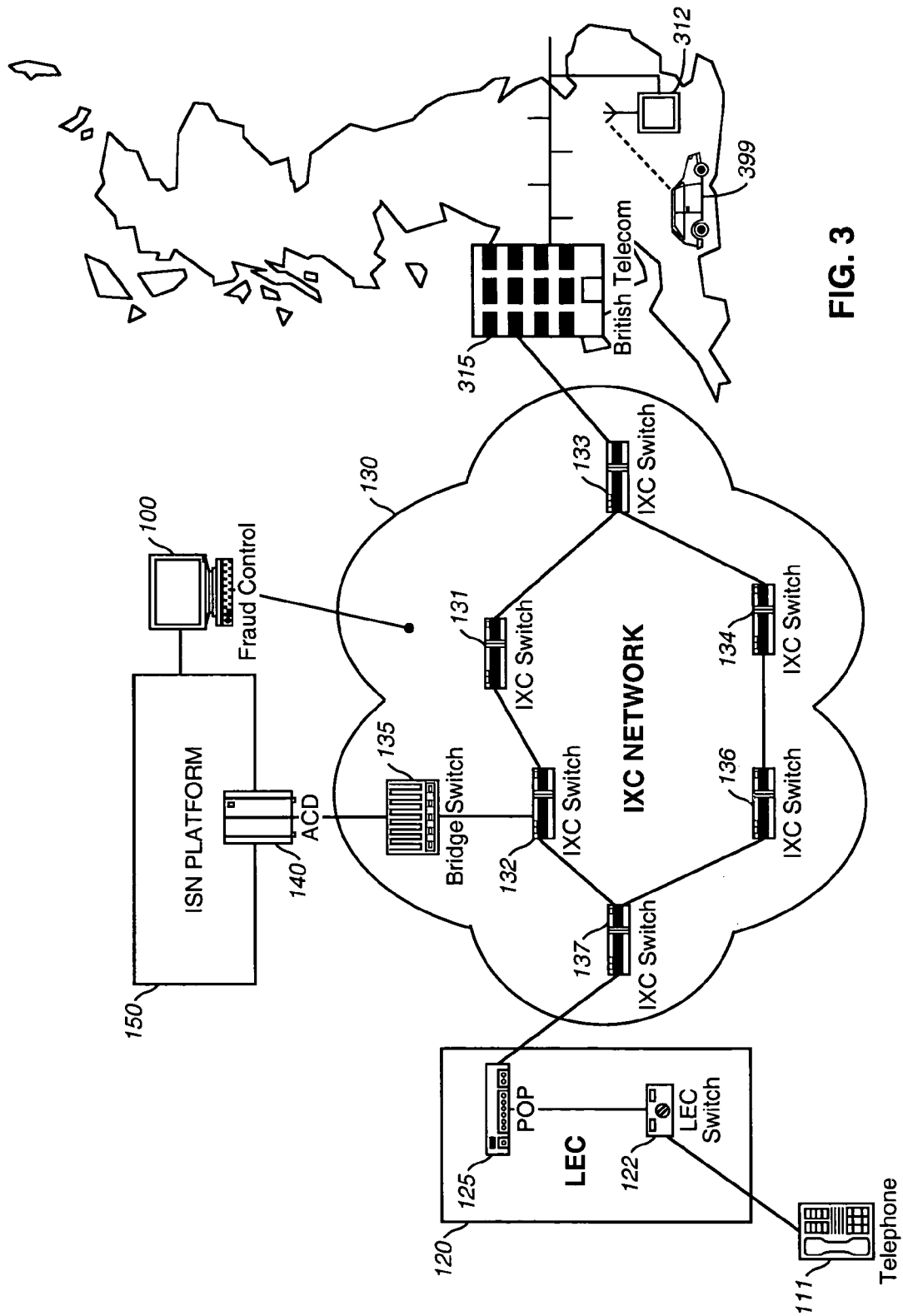
FIG. 3 is a schematic diagram of an exemplary domestic-to-international collect call through a long distance telecommunications system, according to the prior art.

As an example of a domestic-to-international collect call using the preferred embodiment, consider the exemplary call made earlier with reference to FIG. 3. A caller, located at telephone 111 attempts to make a collect call from telephone 111 to a cellular phone located in automobile 399 in England. In this example, the telephone number of the cellular phone is one of a series of telephone numbers that has been recognized as fraudulent by Fraud Control 100, and entered into the blocked collect call field of the CC record of the United Kingdom. The collect call is routed through LEC switch 122 and POP switch 125 to IXC network 130, where it is connected through IXC switches 137 and 132 to bridge switch 135. From the bridge switch 135, the collect call is routed into the ACD 140 of the ISN platform 150, as shown in FIG. 4, according to a preferred embodiment of the present invention.

Once in the ISN platform 150 in FIG. 4, the domestic-to-international collect call is either routed to the MTOC 154 or ARU 152. As part of the validation process, the CC record of the United Kingdom is accessed by either the ARU 152 or the MTOC 154. The destination number of the collect call is compared with the number or numbers in the blocked collect call field of the CC record. Once it is determined that the destination cellular phone number is one of the series of numbers that is blocked from receiving collect calls, there are several courses of actions that may be taken. The collect call could be routed to a live operator to explain the situation to the caller at telephone 111. An automated message could explain the situation to the caller at telephone 111. Either way, the option of an alternative billing method could be presented to the caller. The collect call could also be abruptly terminated. Although abrupt termination may seem unfriendly, if the number of caller hangups during the explanation script reaches a certain percentage, it indicates that only hackers are attempting to reach that telephone number and the resources of the ISN platform 150 should not be wasted explaining their fraudulent activity to them.

By use of the SCREENING INTERNAT'L database 460, many fraudulent domestic-to-international collect calls can be stopped before they are begun, thus saving money for the IXC. Having no set digit size for the blocked collect call field in the CC records allows for very fine or very coarse granularity in the blocking of these types of calls. In another embodiment, there is an additional step of determining whether there are any destination numbers listed in the blocked collect call field before comparing the terminating destination number with the ones listed in the blocked collect call field. In this way, if there are no numbers listed in the blocked collect call field, resources and time are not wasted in making comparisons.

As one skilled in the relevant art would recognize, many elements of a telecommunications network have been left out in order not to obscure the invention in details unnecessary to the understanding of the present invention. In addition, although the above-described embodiment is the preferred embodiment, many modifications would be obvious to one skilled in the art.

While the present invention has been described with respect to a certain preferred embodiment, it should be understood that the invention is not limited to this particular embodiment, but, on the contrary, the invention is intended to cover all modifications, equivalents, and alternatives falling within the spirit and scope of the invention as defined by the appended claims.

What is claimed is:

1. A method for preventing telephony fraud, the method comprising:
   maintaining a centralized database resident within a domestic region, the database being configured to store a block call list that includes a terminating number corresponding to an international region, wherein the database is accessible by all telephony switches within a first telephony network; and
   receiving a database query initiated by one of the telephony switches in response to a collect call placed to a destination number terminated via a second telephony network within the international region, wherein the collect call is blocked if the database query results in a response indicating the destination number is within the block call list.

2. A method according to claim 1, wherein the first telephony network is maintained by a domestic service provider, and the second telephony network is maintained by an international service provider.

3. A method according to claim 2, wherein the block call list is updated based on call records of the second telephony network.

4. A method according to claim 2, wherein the second telephony network includes a cellular network, and the destination number corresponds to a cellular phone.

5. A method according to claim 1, wherein the terminating number in the block call list includes a wildcard character.

6. A method according to claim 1, the method further comprising:
   determining whether the block call list has any entries; and
   comparing the destination number with entries within the block call list if the list has at least one entry.

7. A method according to claim 1, wherein the block call list includes entries that exhibit a fraud-to-revenue ratio exceeding a predetermined threshold or that correspond to accounts that have overdue balances.

8. A method according to claim 1, wherein a record within the database includes the block call list, a field specifying a country code of the international region, and a field specifying a category of billing product, the category including collect calls.

9. A system for preventing telephony fraud, the system comprising:
   a centralized database resident within a domestic region, the database being configured to store a block call list that includes a terminating number corresponding to an international region, wherein the database is accessible by all telephony switches within a first telephony network,
   wherein a database query is initiated by one of the telephony switches in response to a collect call placed to a destination number terminated via a second telephony network within the international region, wherein the collect call is blocked if the database query indicates the destination number is within the block call list.

10. A system according to claim 9, wherein the first telephony network is maintained by a domestic service provider, and the second telephony network is maintained by an international service provider.

11. A system according to claim 10, wherein the block call list is updated based on call records of the second telephony network.

12. A system according to claim 10, wherein the second telephony network includes a cellular network, and the destination number corresponds to a cellular phone.

13. A system according to claim 9, wherein the terminating number in the block call list includes a wildcard character.

14. A system according to claim 9, wherein a determination is made whether the block call list has any entries before comparing the destination number with entries within the block call list.

15. A system according to claim 9, wherein the block call list includes entries that exhibit a fraud-to-revenue ratio exceeding a predetermined threshold or that correspond to accounts that have overdue balances.

16. A system according to claim 9, wherein a record within the database includes the block call list, a field specifying a country code of the international region, and a field specifying a category of billing product, the category including collect calls.

17. A system for preventing telephony fraud, the system comprising:
   a bridging switch configured to access a centralized database, the centralized database being resident within a domestic region and being configured to store a block call list that includes a terminating number corresponding to an international region; and
   an interexchange switch in communication with the bridging switch and configured to process a collect call placed to a destination number corresponding to a device served by a first service provider, wherein the interexchange switch and the bridging switch are operated by a second service provider, the collect call initiating a database query to the database, wherein the collect call is blocked if the database query results in a response indicating the destination number is within the block call list.

18. A system according to claim 17, wherein the first service provider is an international service provider, and the second service provider is a domestic service provider.

19. A system according to claim 18, wherein the block call list is updated based on call records of the first service provider.

20. A system according to claim 18, wherein the device is a cellular phone.

* * * * *